United States Patent
Wang et al.

(10) Patent No.: US 9,286,662 B2
(45) Date of Patent: Mar. 15, 2016

(54) SINGLE IMAGE SUPER RESOLUTION AND DENOISING USING MULTIPLE WAVELET DOMAIN SPARSITY

(71) Applicant: Siemens Aktiengesellschaft, Munich (DE)

(72) Inventors: Qiu Wang, Princeton, NJ (US); Ozgur Balkan, San Diego, CA (US); Boris Mailhe, Plainsboro, NJ (US); Mariappan S. Nadar, Plainsboro, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/479,583

(22) Filed: Sep. 8, 2014

(65) Prior Publication Data
US 2015/0086131 A1 Mar. 26, 2015

Related U.S. Application Data

(60) Provisional application No. 61/882,761, filed on Sep. 26, 2013.

(51) Int. Cl.
*G06K 9/40* (2006.01)
*G06T 5/00* (2006.01)
*G06T 3/40* (2006.01)
*G06T 5/10* (2006.01)

(52) U.S. Cl.
CPC ............... *G06T 5/002* (2013.01); *G06T 3/4053* (2013.01); *G06T 5/003* (2013.01); *G06T 5/10* (2013.01); *G06T 2207/20064* (2013.01)

(58) Field of Classification Search
None
See application file for complete search history.

(56) References Cited

U.S. PATENT DOCUMENTS

| 2006/0291728 A1* | 12/2006 | Napoletani et al. ........... 382/224 |
| 2010/0092082 A1* | 4/2010 | Hirakawa et al. ............. 382/167 |
| 2014/0253781 A1* | 9/2014 | Gill et al. ....................... 348/335 |
| 2015/0187052 A1* | 7/2015 | Amroabadi et al. .......... 382/131 |

OTHER PUBLICATIONS

Lina, Jean-Marc. "Image processing with complex Daubechies wavelets." Journal of Mathematical Imaging and Vision 7.3 (1997): 211-223.*

* cited by examiner

*Primary Examiner* — Andrew Moyer

(57) ABSTRACT

A computer-implemented method of enhancing images includes receiving one or more observed images, identifying wavelet bases, and determining a downsampling operator. A noise variance value is estimated and used to select a tuning parameter. A blurring kernel is estimated based on one or more system calibration parameter and used to determine a low-pass blurring filter operator. A cost function is created which generates one or more denoised super-resolution images based on the observed images and the plurality of wavelet bases. The cost function may include, for example, a sparsity inducing norm applied to the plurality of wavelet bases (with the tuning parameter applied to the sparsity inducing norm) and a constraint requiring the one or more denoised super-resolution images to be equal to a result of applying the low-pass blurring filter operator and the downsampling operator to the one or more denoised super-resolution images. The one or more denoised super-resolution images are generated by minimizing this cost function.

20 Claims, 22 Drawing Sheets

SINGLE IMAGE SUPER RESOLUTION AND DENOISING USING MULTIPLE WAVELET DOMAIN SPARSITY

CROSS-REFERENCE TO RELATED APPLICATIONS

This application claims priority to U.S. provisional application Ser. No. 61/882,761 filed Sep. 26, 2013 which is incorporated herein by reference in its entirety.

TECHNOLOGY FIELD

The present invention relates generally to methods, systems, and apparatuses for performing image super-resolution and denoising by inducing sparsity over multiple wavelet bases. The disclosed methods, systems, and apparatuses may be applied to natural scene images as well as medical images from different modalities including Magnetic Resonance Imaging (MRI), Computed Tomography (CT), Ultrasound, etc. For example, it can be applied to process cardiac images gathered by Magnetic Resonance Imaging (MRI) devices.

BACKGROUND

Single-image super-resolution is a technique used to obtain a higher resolution image given a single low resolution image. The technique is used, for example, in the television industry when the image to be shown has to be expanded to fill the display. The technique is also used in medical applications to minimize image acquisition time where there are speed or dosage concerns. In conventional systems, single image super-resolution is performed using techniques such as interpolation and patch-based dictionary learning. State of the art results are obtained by patch based dictionary learning for sparse representation. However, for these types of methods, one needs to learn the dictionary on several training images, which makes it intractable due to high computation time and possibility of lack of training images.

Image denoising is the task of removing unwanted noise to obtain a better quality, clearer image. Denoising is especially applicable to medical imaging modalities such as ultrasound or MRI which suffer from a high acquisition noise. For CT, efficient image denoising can allow for significant dose radiation dose reduction. The image denoising problem has been addressed in several ways, such as wavelet denoising and patch-based nonlocal algorithms. Wavelet-based sparsity approaches have the benefit of carrying a regularization parameter, which adjusts the smoothness-noise balance of the resulting image. However, conventional wavelet approaches are based on a single wavelet transform. The performance of such a transform is limited due to the sparse representation limitations of a single wavelet transform. Also, regularization with a single wavelet basis may induce unwanted artifacts in the solution.

SUMMARY

Embodiments of the present invention address and overcome one or more of the above shortcomings and drawbacks, by providing methods, systems, and apparatuses related to an image processing technique which induces sparsity over multiple wavelet bases rather than a single wavelet to enhance image denoising and single-image super-resolution processing. This technique, referred to herein as the "Image Enhancement Process," may be applied to various image processing applications including, for example, the processing of Magnetic Resonance Imaging (MRI) images.

According to some embodiments of the present invention, a computer-implemented method of enhancing images includes receiving one or more observed images and determining a downsampling operator. A plurality of wavelet bases is identified. These bases may include, for example, Daubechies wavelet bases. The bases may also include cycle-spinned versions or complex dual wavelet transform versions of the Daubechies wavelet bases. A noise variance value is estimated and used to select a tuning parameter. A blurring kernel is estimated based on one or more system calibration parameter and used to determine a low-pass blurring filter operator. A cost function is created which generates one or more denoised super-resolution images based on the observed image(s) and the wavelet bases. The cost function may include, for example, a sparsity inducing norm applied to the wavelet bases (with the tuning parameter applied to the sparsity inducing norm) and a constraint requiring the denoised super-resolution images to be equal to the result of applying the low-pass blurring filter operator and the downsampling operator to the denoised super-resolution images. The denoised super-resolution images are generated by minimizing this cost function, for example, using an alternating direction method of multipliers (ADMM) algorithm.

According to other embodiments of the present invention, denoising may be performed prior to, or independently from, super-resolution. For example, in some embodiments, a computer-implemented method of enhancing one or more images includes creating a cost function which generates denoised images based on one or more observed images and wavelet bases, wherein the cost function applies a sparsity-inducing norm to the wavelet bases. The denoised images are generated by minimizing the cost function. In one embodiment, this method also includes selecting a tuning parameter based on a noise variance value and the cost function applies the tuning parameter to the sparsity-inducing norm. In some embodiments, super-resolution functionality is added to the aforementioned method by estimating a blurring kernel based on system calibration parameters, determining a low-pass blurring filter operator based on the blurring kernel and determining a downsampling operator. Minimization of the cost function may then be constrained by applying the low-pass blurring filter operator and the downsampling operator to the one or more denoised images Similarly, super-resolution may be performed prior to, or independently from, denoising in some embodiments of the present invention. For example, in some embodiments, a cost function is created which generates one or more super-resolution images based on the observed images by applying a sparsity-inducing norm to a plurality of wavelet bases. Then one or more super-resolution images are generated by minimizing the cost function, wherein minimization of the cost function is constrained by requiring the generated super-resolution images to be equal to the result of applying a low-pass blurring filter operator and a downsampling operator to the one or more super-resolution images. Minimization of the cost function may be performed, for example, using an iterative reweighted L−1 norm minimization. Denoising may be added by including one or more denoising terms in the cost function. For example, in some embodiments, a noise variance value is estimated and used to select a tuning parameter. The cost function can then apply the tuning parameter to the sparsity-inducing norm.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The following disclosure describes the present invention according to several embodiments directed at methods, systems, and apparatuses for performing an Image Enhancement Process utilizing multiple wavelet domain sparsity image processing. Briefly, sparsity is induced over multiple wavelet bases instead of a single one for use in image denoising and/or super-resolution applications. The technology described herein is especially applicable, but by no means limited to, the denoising and super-resolution of MRI images.

Figure 1:
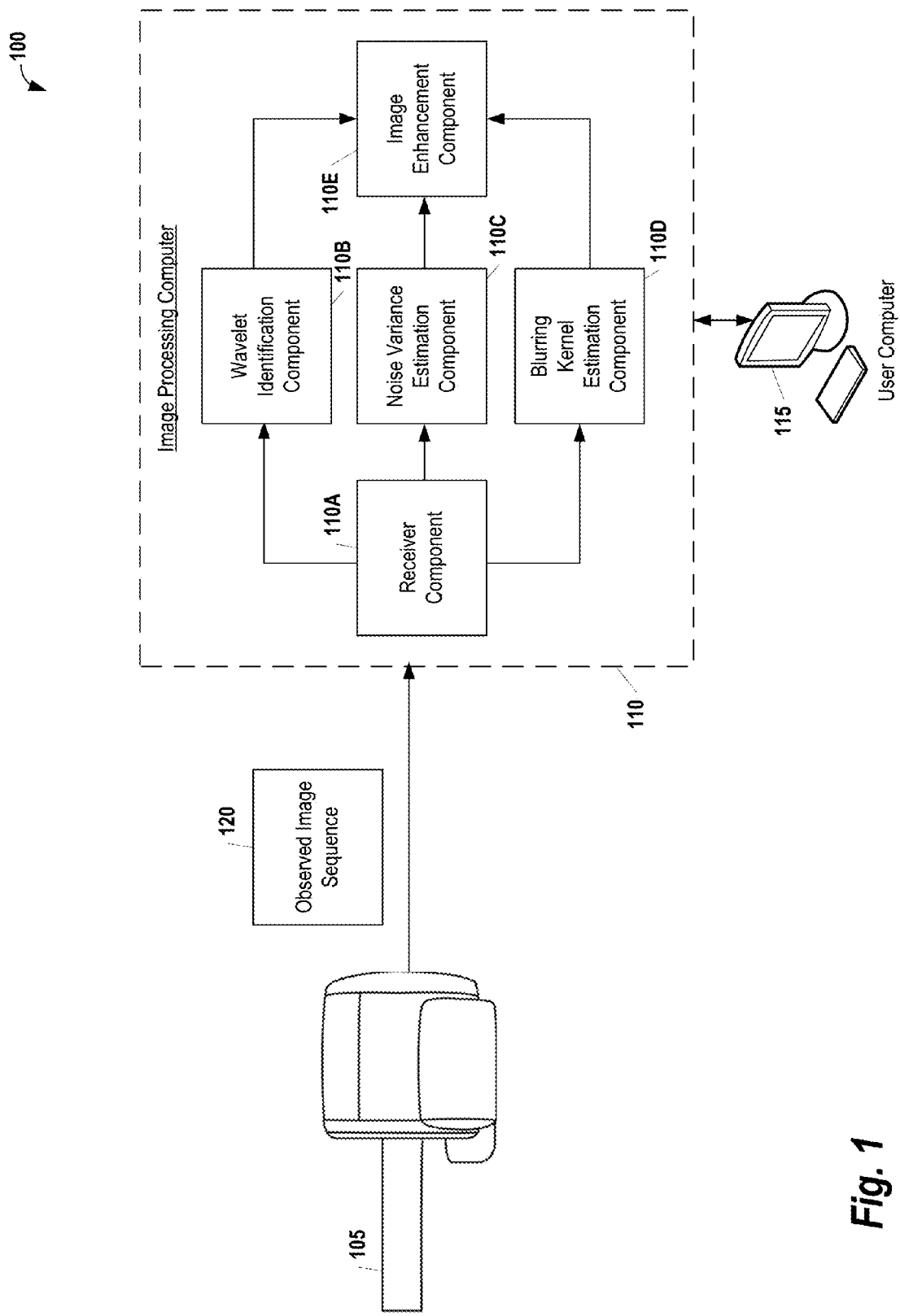
FIG. 1 provides a system view of a system for performing an Image Enhancement Process, according to some of embodiments of the present invention.

FIG. 1 provides a system view 100 of a system for performing an Image Enhancement Process, according to some of embodiments of the present invention. In the example of FIG. 1, the Image Enhancement Process performs both denoising and super-resolution by inducing sparsity on multiple wavelet bases. However, as explained in greater detail below, in other embodiments of the present invention, sparsity may be induced on multiple wavelets to only perform denoising or super-resolution independently.

In the example of FIG. 1, a Receiver Component 110A in the Image Processing Computer 110 receives an Observed Image Sequence 120 (e.g., including one or more MRI images) from the MRI Device 105. A Wavelet Identification Component 110B identifies a group of wavelet bases based on input from the user provided via User Computer 115. Such input may be provided at the time that the Image Enhancement Process is performed by the Image Processing Computer 110. Alternatively, such input may be read from a file generated by the user prior to execution of the Image Enhancement Process. Moreover, in some embodiments, the group of wavelet bases is automatically identified by the system and communication with the User Computer 115 is not required.

Continuing with reference to FIG. 1, a Noise Variance Estimation Component 110C in the Image Processing Computer 110 estimates the variance of the noise in the Observed Image Sequence 120 using one or more techniques known in the art. A Blurring Kernel Estimation Component 110D estimates a blurring kernel to provide smoothing of the Observed Image Sequence 120 based on system calibration parameters provided by User Computer 115. These system calibration parameters may provide, for example, an identification of item of interest captured in the Observed Image Sequence 120 which, in turn, may be used to determine a size for the estimated blurring kernel.

An Image Enhancement Component 110E included in the Image Processing Computer 110 creates and applies a cost function to the Observed Image Sequence 120 to generate one or more denoised and super-resolved images based on the group of wavelet bases identified by the Wavelet Identification Component 110B. To perform super-resolution, the Image Enhancement Component 110E may determine a low-pass blurring filter operator based on the estimated blurring kernel and a downsampling operator based on the selected downsampling value. The content of the cost function may then include, for example, a sparsity inducing norm applied to the wavelet bases and a constraint requiring the one or more generated images to be equal to a result of applying the low-pass blurring filter operator and the downsampling operator to the generated images. The Image Enhancement Component 110E then generates the denoised, super-resolution images by minimizing the cost function. This minimization may be solved using various techniques known in the art including, for example, Alternating Direction Method of Multipliers (ADMM), Fast Iterative Shrinkage-Thresholding Algorithm (FISTA), Conjugated Gradient, or Gradient Descent techniques. Once the image has been processed by the Image Enhancement Component 110E it may be stored for later use or displayed, for example, on the User Computer 115.

As noted above, the Image Enhancement Process may include denoising and/or image enhancement features. The paragraphs that follow describe each of these features in greater detail and provide some examples of how these features may be implemented according to different embodiments of the present invention.

Assume the following linear model for the image denoising problem:

$$y = x + e \quad (1)$$

where y, x, and $e \in \mathbb{R}^{n \times 1}$ are the observed image of n pixels, the original image, and gaussian observation noise respectively. The task is to recover an M×N image x from the noisy observation y by incorporating an appropriate prior distribution for the image (n=MN).

Observing the inherent piece-wise smoothness in most natural images, a total variation (TV) based image prior may be used for modeling those signals of interest. There are two variants of the TV penalty: isotropic and anisotropic. Selection of the particular variant utilized may depend on a variety of factors including, for example, its relationship to the underlying transform used by the technique. For example, in some embodiments, the anisotropic total variation is used due to its close relation with redundant Haar wavelet transform. The analytic expression of the anisotropic TV penalty of an image is given as below:

$$TV(x) = \sum_{i=1}^{M} \sum_{j=1}^{N} |x(i, j+1) - x(i, j)| + |x(i+1, j) - x(i, j)| \quad (2)$$

where out of boundary values are handled by periodically repeating the image in the spatial domain in both directions such that the connection to redundant Haar transform is satisfied. For a given piece-wise smooth image, the TV penalty is expected to be low. Therefore, it is reasonable to minimize the cost function given below in order to find a good estimate of the original image to be recovered:

$$\min_{x} \frac{1}{2} \|y - x\|_2^2 + \lambda TV(x) \quad (3)$$

where λ is a trade-off parameter that balances the total variation of the image and the observation consistency. One Bayesian interpretation of this cost function is through MAP estimation with the following probability distributions.

A significant improvement in denoising (and super-resolution, as described below) can be achieved by increasing the size of the wavelet operator is increased (i.e., making it more over-complete by adding multiple wavelet bases). The cost function to be minimized for denoising becomes:

$$\min_{x} \frac{1}{2} \|y - x\|_2^2 + \lambda \|\psi x\|_p \quad (4)$$

where $\psi = [W_1^T W_2^T \ldots W_k^T]^T$ is concatenation of k wavelet bases (e.g., from Db1-Dbk). To enhance performance, a $l_p$ norm (0<p<1) may be used instead of $l_1$ norm is used as a prior. For this purpose, in some embodiments, an iterative reweighted $l_1$ norm minimization method is used. In some embodiments, an Alternating Direction Method of Multipliers (ADMM) algorithm is constructed and used to solve the above cost function. In this way, the desired smoothness of the result may be adjusted by varying a regularization parameter. In other embodiments, Equation (4) may be solved with alternative algorithms such as, for example, Fast Iterative Shrinkage-Thresholding Algorithm (FISTA), Conjugated Gradient, or Gradient Descent.

Figure 2:
FIG. 2 provides an example of denoising the Lena image using a single wavelet.
Figure 3:
FIG. 3 provides an example of denoising the Lena image using MAP-TV.
Figure 4:
FIG. 4 provides a zoomed-in portion of the image shown in FIG. 2.
Figure 5:
FIG. 5 shows an example of denoising the Lena image with the Image Enhancement Process described herein, according to some embodiments of the present invention.
Figure 6:
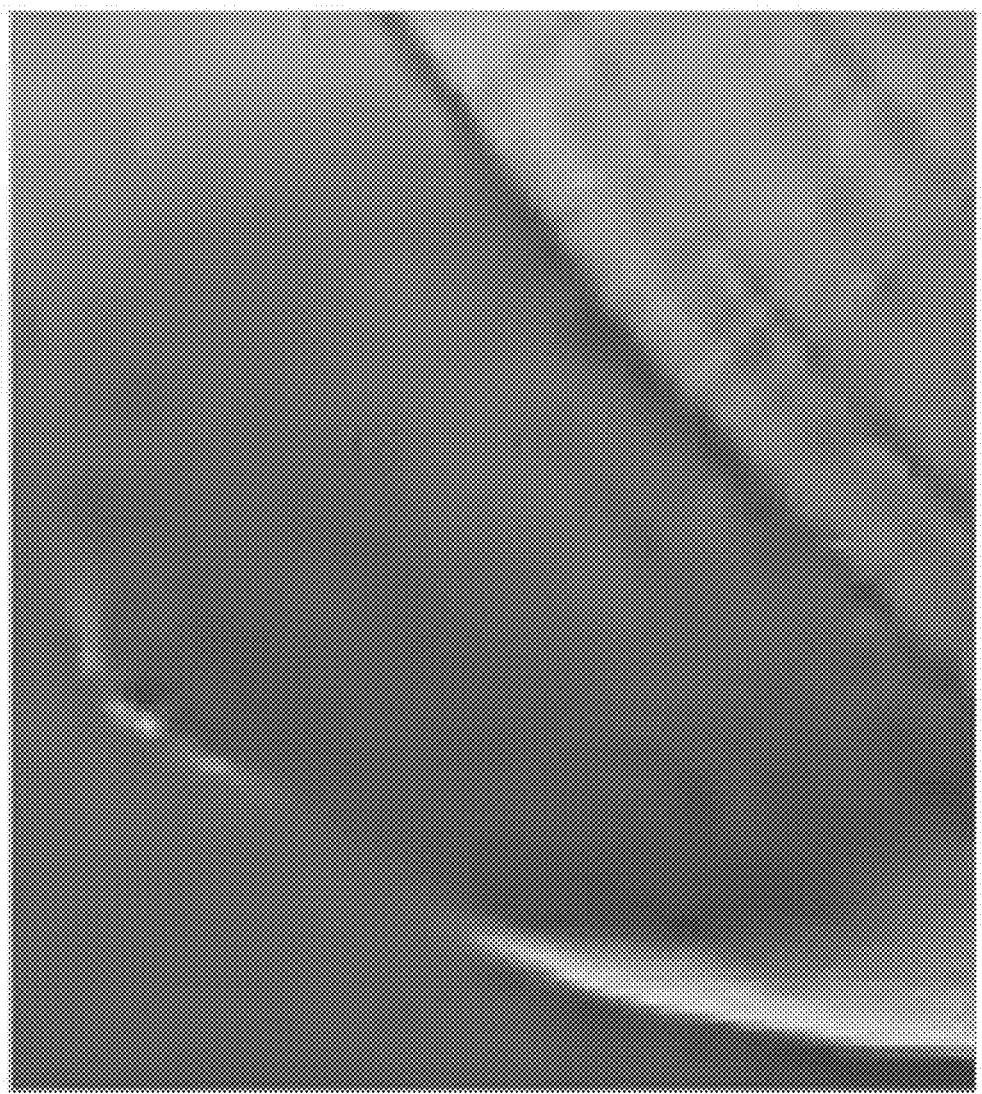
FIG. 6 provides a zoomed-in portion of the image shown in FIG. 5.
Figure 7:
FIG. 7 shows an example of denoising the Lena image with Db1-Db4, according to some embodiments of the present invention.

FIGS. 2-7 provide several example images that illustrate the differences between applying conventional image processing techniques and the Image Enhancement Process described herein, according to some embodiments of the present invention. Specifically, FIGS. 2-4 illustrate the results of applying conventional techniques to processing the Lena image (a standard image used in the art for testing image processing techniques). FIG. 2 provides an example of denoising an image using only Db1 (i.e., Haar) where, for k=1, the peak signal-to-noise ratio (PSNR) is 31.70. FIG. 4 provides a zoomed-in portion of the image shown in FIG. 2. FIG. 3 shows an example of the Lena image processed by MAP-TV, resulting with PSNR equal to 34.56. FIG. 5 shows an example of denoising the Lena image with the Image Enhancement Process described herein, according to some embodiments of the present invention. The example of FIG. 5 was generated with Db1-Db8 and k=8, resulting in a PSNR of 35.36. FIG. 6 provides a zoomed-in portion of the image shown in FIG. 5. For comparison, FIG. 7 shows an example of denoising with Db1-Db4. As demonstrated by FIGS. 5-7, the Image Enhancement Process provides a significant improvement in the fidelity of the image.

Figure 8:
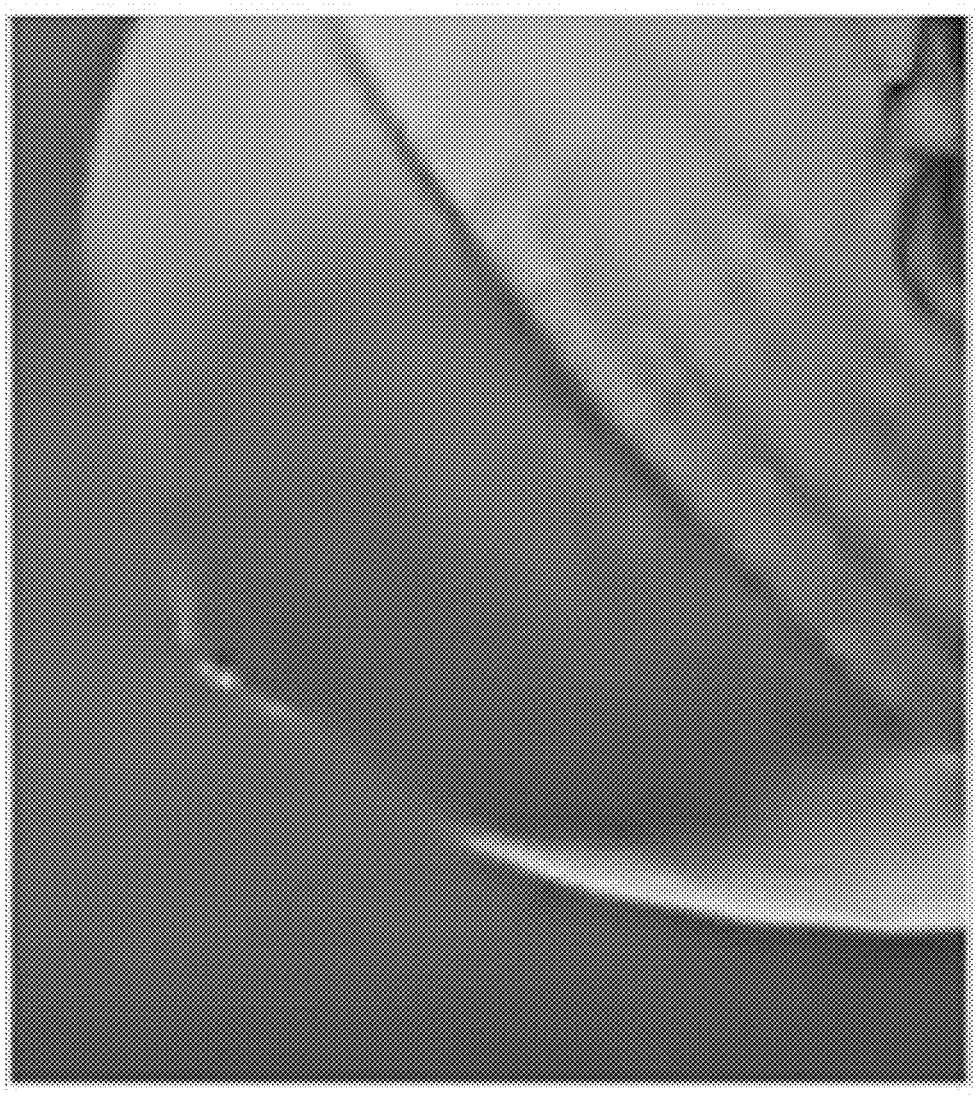
FIG. 8 shows an example of denoising without cycle spinning, according to some embodiments of the present invention.
Figure 9:
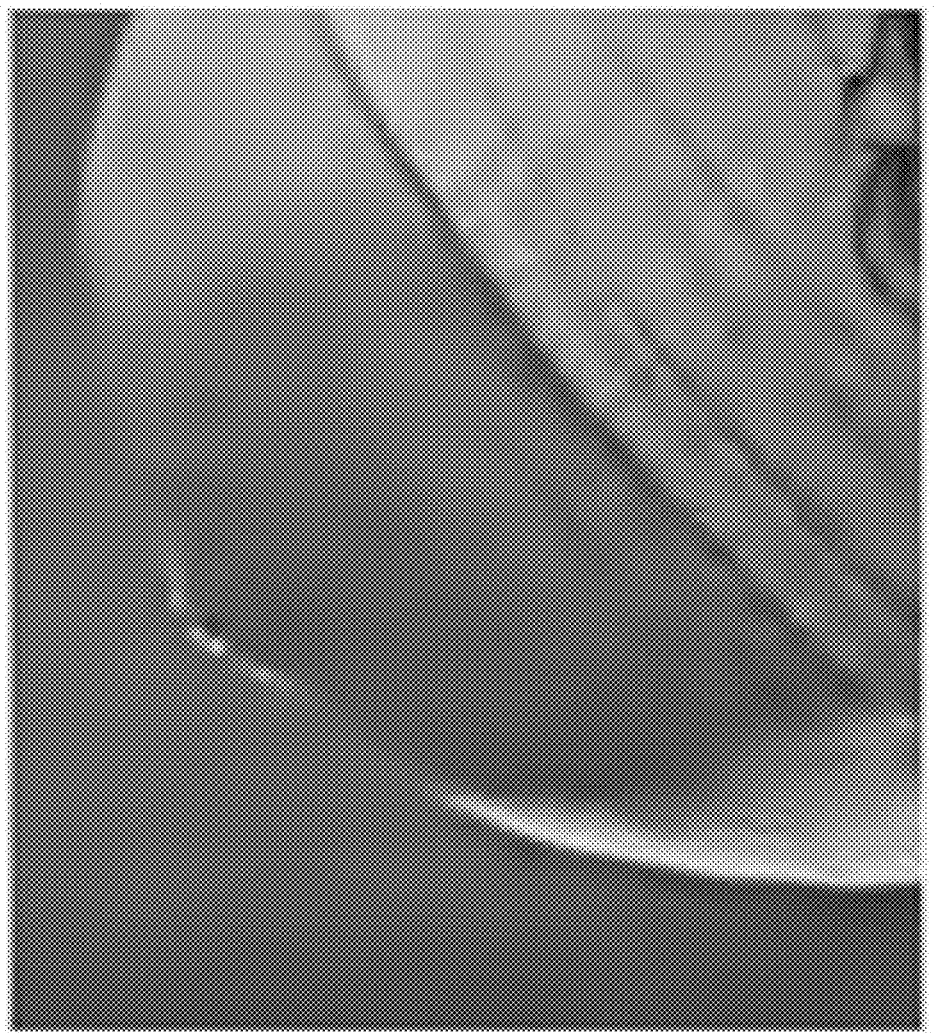
FIG. 9 shows denoising with cycle spinning, according to some embodiments of the present invention.

In some embodiments, cycle-spinned wavelet transforms may be incorporated into the concatenation of wavelet bases ψ in Equation (4) to further improve performance. For each decimated wavelet basis that is used, the cycle-spinned versions may also be added to ψ to arrive at an undecimated multiple bases 4-level wavelet transform. FIGS. 8 and 9 illustrate the improvement in terms of PSNR and visual quality on the denoised images. Specifically, FIG. 8 shows an example of denoising without cycle spinning for k=8. The peak signal-to-noise ratio in this example is 35.36. FIG. 9 shows denoising with cycle spinning, also for k=8. Here the peak signal-to-noise ratio is 35.57 and the details on the hat are better preserved.

Single image super-resolution problem can be formulated under the following linear inverse model:

$$y = DHx + e \quad (5)$$

where D is the downsampling operator, H is the low-pass blurring filter operator with kernel h and e is the gaussian noise vector with standard deviation of σ. In this work we will assume that σ=0, although it can be extended to noisy cases. The problem of finding the higher resolution image x from the observation y is an ill-posed problem, i.e., there are infinitely many solutions. One way to get a good estimate of the underlying high resolution image is to enforce priors on x. Natural images are piece-wise smooth which makes using the total variation (TV) penalty suitable for this purpose. The cost function in this case would be:

$$\min_x \|y - DHx\|_2^2 + \lambda TV(x) \quad (6)$$

for the noiseless case, it may be preferable to solve:

$$\min_x TV(x) \quad (7)$$

$$\text{s.t.} \quad y = DHx \quad (8)$$

which is equivalent to:

$$\min \|W_d x\|_1 \quad (9)$$

$$s.t. y = DHx \quad (10)$$

where Wd is the operator returning the detail coefficients of undecimated Haar transform (in the case of anisotropic TV).

According to various embodiments of the present invention, the single image super-resolution problem is solved by enforcing sparsity in multiple bases wavelet domain as was done for denoising. The super-resolution problem becomes $$\min \|\psi x\|_p \quad (11)$$

$$s.t. y = DHx \quad (12)$$

where $\psi = [W_1^T W_2^T \ldots W_k^T]^T$ is concatenation of k wavelet bases, from Db1-Dbk. The $l_p$ norm minimization may then be solved, for example, via an iterative reweighted $l_1$ norm minimization. In some embodiments, the super-resolution technique described in Equations (11) and (12) is combined with denoising technique described above with reference to Equation (4). Specifically, the following constraint may be added to Equation (4) to provide for super-resolution in combination with denoising:

$$s.t. \|y - DHx\|_2^2 \le e \quad (14)$$

where e is equal to the gaussian noise vector, as described above.

The techniques described herein may also be extended to denoising and super-resolution applications involving multiple image frames. For example, for a set of images N, Equations (4) and (14) may be extended to:

$$\min_x \frac{1}{2} \sum_i^N \|y_i - x\|_2^2 + \lambda \|\psi x\|_p \quad (13)$$

$$\text{s.t.} \sum_i^N \|y_i - DHx\|_2^2 \le e \quad (14)$$

In some embodiments, additional terms may be added to the above equations to compensate for motion correction between image frames.

Figure 10:
FIG. 10 provides a comparison of super-resolution using conventional techniques versus the Image Enhancement Process described herein, according to some embodiments of the presented invention.
Figure 11:
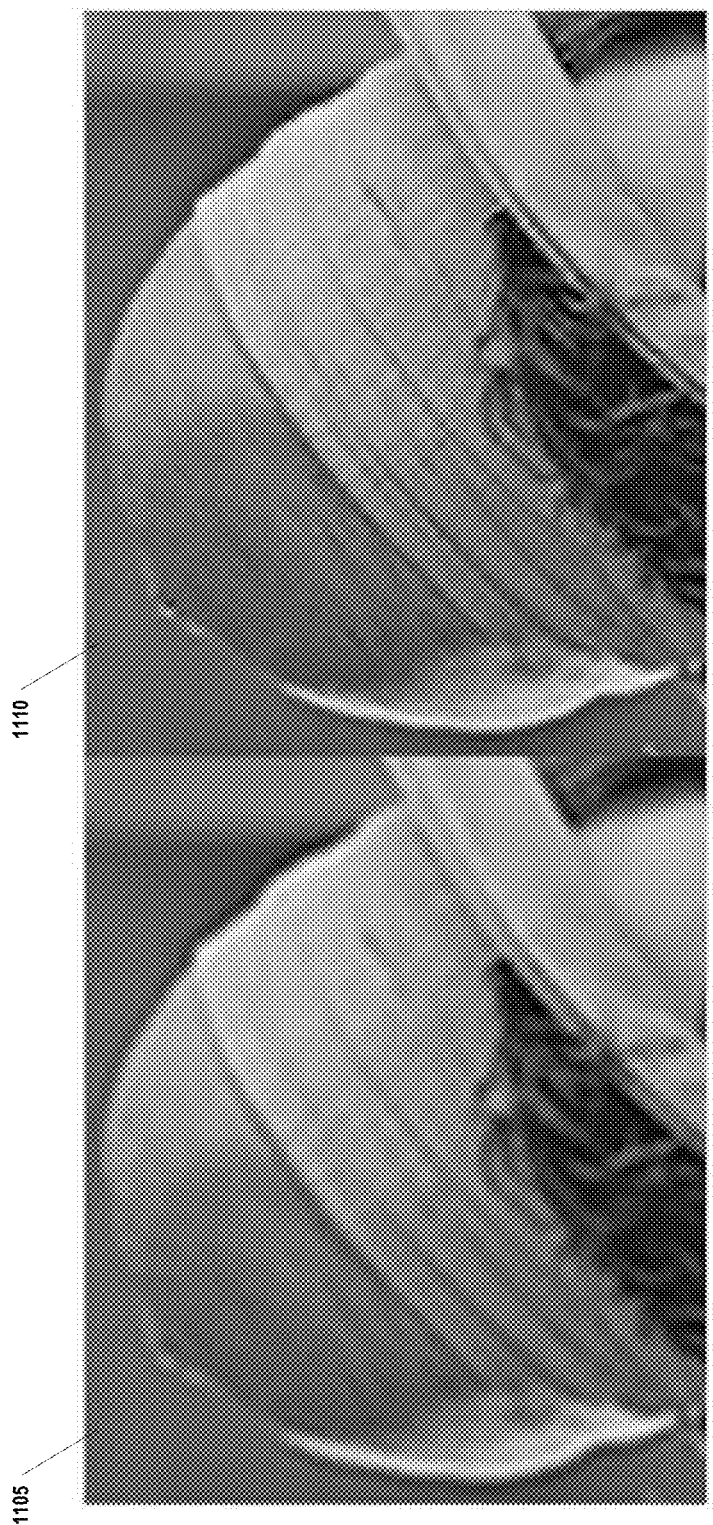
FIG. 11 provides a zoomed-in portion of the Lena image comparing a conventional super-resolution technique and the Image Enhancement Process described herein, according to some embodiments of the presented invention.
Figure 12:
FIG. 12 shows application of conventional techniques conventional image processing techniques to the Cameraman Image.

FIGS. 10-12 provide a comparison of super-resolution using conventional techniques versus the Image Enhancement Process described herein, according to some embodiments of the presented invention. In the experiments used to generate these figures, a low resolution image was obtained from a higher resolution image, by first applying a Gaussian filter h, and downsampling with a scale of r. FIG. 10 shows the results where r=3 and h has a size of 7, with standard deviation of 2. In FIG. 10, Image 1020 shows the original image. Image 1005 and 1010 show the results of processing the Image 1020 with the convention techniques of a Bicubic Interpolation and TV super-resolution respectively. These images 1005 and 1010 have PSNR values of 26.88 and 31.45, respectively. Image 1015 shows the results of processing Image 1020 using the Image Enhancement Process described herein with multiple wavelet bases Db1-Db8. In Image 1015, the PSNR is 32.93, a significant improvement over the conventional techniques.

FIG. 11 provides a zoomed-in portion of the Lena image, demonstrating that artifacts around the edges introduced by TV are minimized, if not eliminated altogether, when the Image Enhancement Process described herein are used. In particular, Image 1105 shows the Lena image processed by TV where there is an undecimated Haar penalty. This may be contrasted with Image 110 which reshows the results of processing the image with the Image Enhancement Process, where there is a Db1-Db8 penalty.

Figure 13:
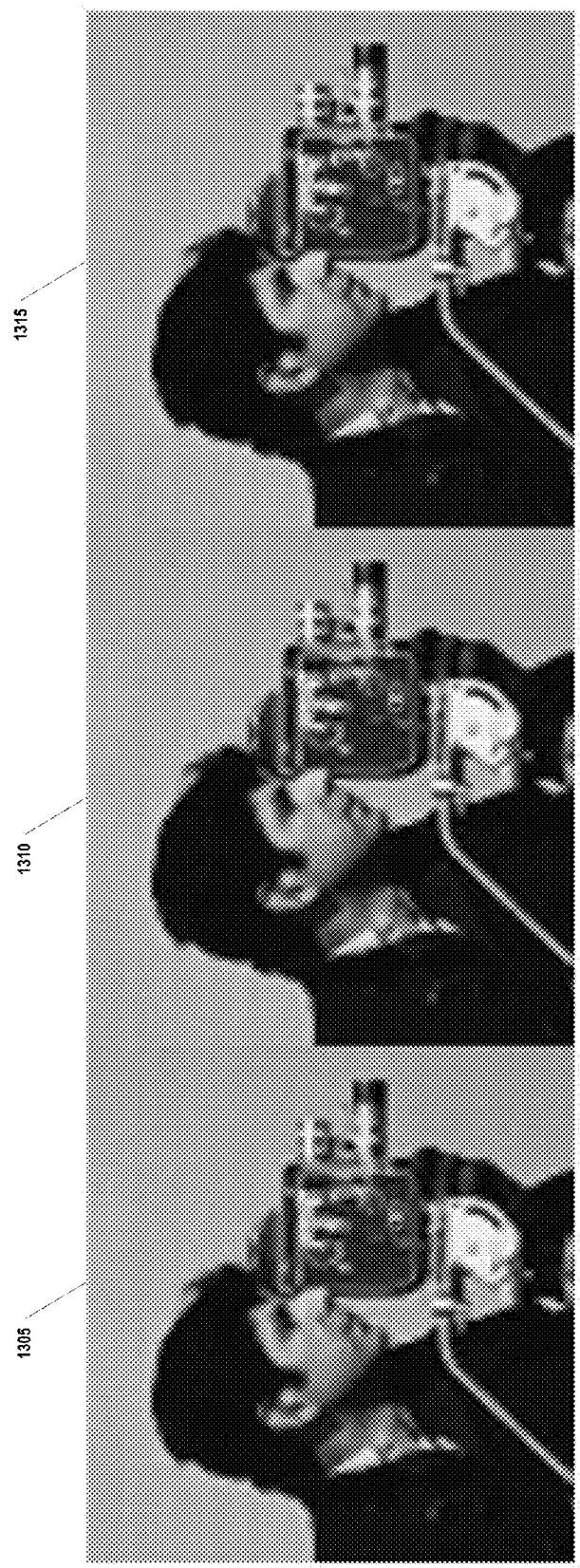
FIG. 13 shows application of Image Enhancement Process described herein to the Cameraman Image, according to some embodiments of the presented invention.

FIGS. 12 and 13 show a comparison of the Image Enhancement Process described herein with conventional techniques when applied to the standard test image referred to as the "Cameraman." The original Cameraman image is shown in Image 1315 of FIG. 13. FIG. 12 shows two images 1205 and 1210 illustrating the results of applying a Bicubic Interpolation (PSNR=28.39) and TV (PSNR=34.74), respectively. This may be contrasted with FIG. 13 where the Image Enhancement Process described herein is applied to the Cameraman Image. Specifically, image 1305 shows Db1-Db4 (PSNR=36.09) and image 1310 shows Db1-Db8 (PSNR=38.83). It can be seen from FIGS. 12 and 13 that Image Enhancement Process gives significantly better results in terms of both PSNR and visual quality.

Figure 14:
FIG. 14 shows a comparison of conventional super-resolution techniques with the Image Enhancement Process described herein, according to some embodiments of the presented invention.
Figure 15:
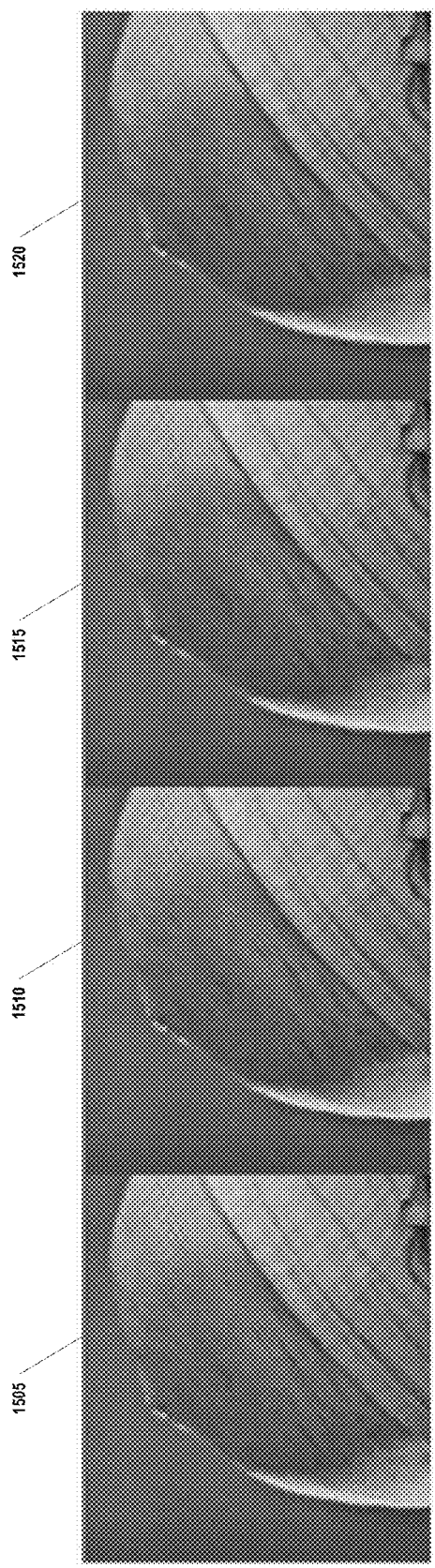
FIG. 15 shows a comparison of images processed by Image Enhancement Process described herein, with and without various combinations of cycle-spinning and dual complex wavelets, according to some embodiments of the presented invention.
Figure 16:
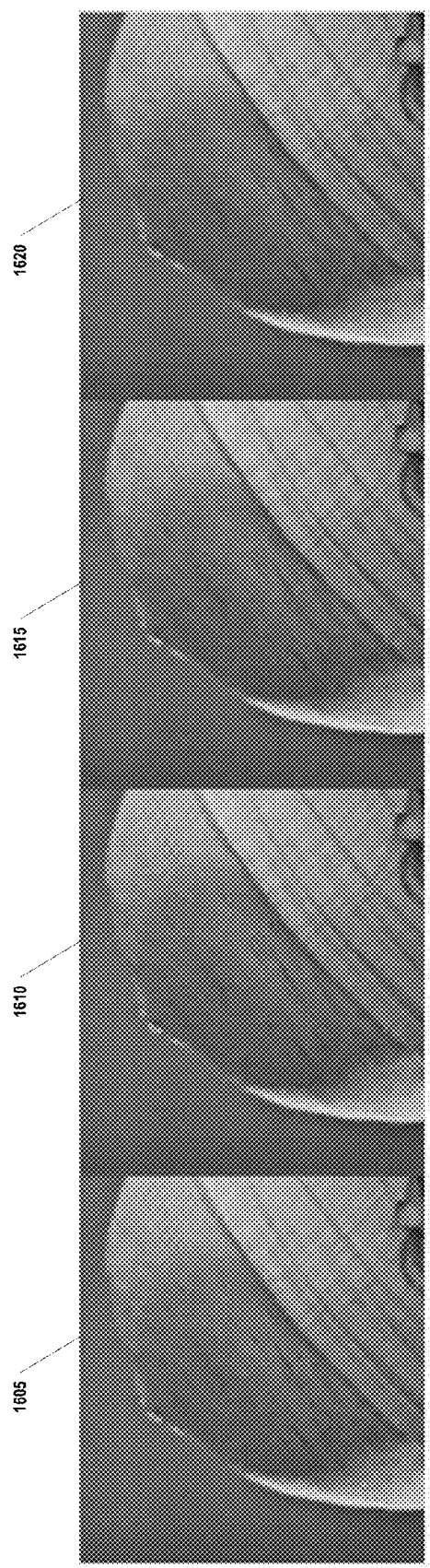
FIG. 16 illustrates a series of images illustrating the effect of adding spinning and dual complex wavelet transform to the bases of Db1-Db4, according to some embodiments of the presented invention.

FIGS. 14-16 show a comparison of the Image Enhancement Process, as implemented according to some embodiments of the present invention, with conventional interpolation techniques. FIG. 14 shows the results of interpolating the Lena image. Specifically, images 1405, 1410, and 1415 show the results of processing with Bicubic Interpolation (PSNR=29.78), Sparse Mixing Estimation (PSNR=31.00), and Spatially Adaptive Iterative Singular-value Thresholding (PSNR=30.99), respectively. Image 1420 shows the results using the Image Enhancement technique described herein, with Db1-Db8 (PSNR=36.13).

As noted above, cycle spinning may be added to each basis (Db1-Db8) to further improve the results both in terms of PSNR and visual quality. In addition to the bases of Db1-Db8, a complex dual wavelet transform is also added in order to include directed filters in the wavelet transform ψ. However, as can be seen in FIG. 15, adding both cycle spinning and dual complex wavelet transform may result in a decrease in PSNR because now the transform is too redundant. Image 1505 shows Db1-Db8 (PSNR=36.13). Image 1510 shows Db1-Db8+ cycle spinning (PSNR=36.51). Image 1515 illustrates Db1-Db8+ dual complex wavelet (PSNR=36.71), Db1-Db8+ dual complex wavelet+cycle spinning (PSNR=36.56). The same idea may be repeated by using only 4 bases as the starting point. For example FIG. 16 illustrates a series of images which demonstrate that adding spinning and dual complex wavelet transform to the bases of Db1-Db4, results in a significant improvement both in PSNR and visual quality. Image 1605 shows the results for Db1-Db4 where PSNR is 35.53. In image 1610 cycle-spinning is added and PSNR increases to 36.62. Image 1615 shows the results when Db1-Db4 is combined with a dual complex waveform, resulting in PSNR of 36.58. Combining Db1-Db4 with both a dual complex wavelet and cycle spinning results in image 1620, which has a PSNR value of 36.91.

Figure 17:
FIG. 17 illustrates a comparison of the Image Enhancement Process, as implemented in some embodiments of the present invention, with the conventional super-resolution method of Adaptive Sparse Domain Selection (ASDS) using the Lena image.
Figure 18:
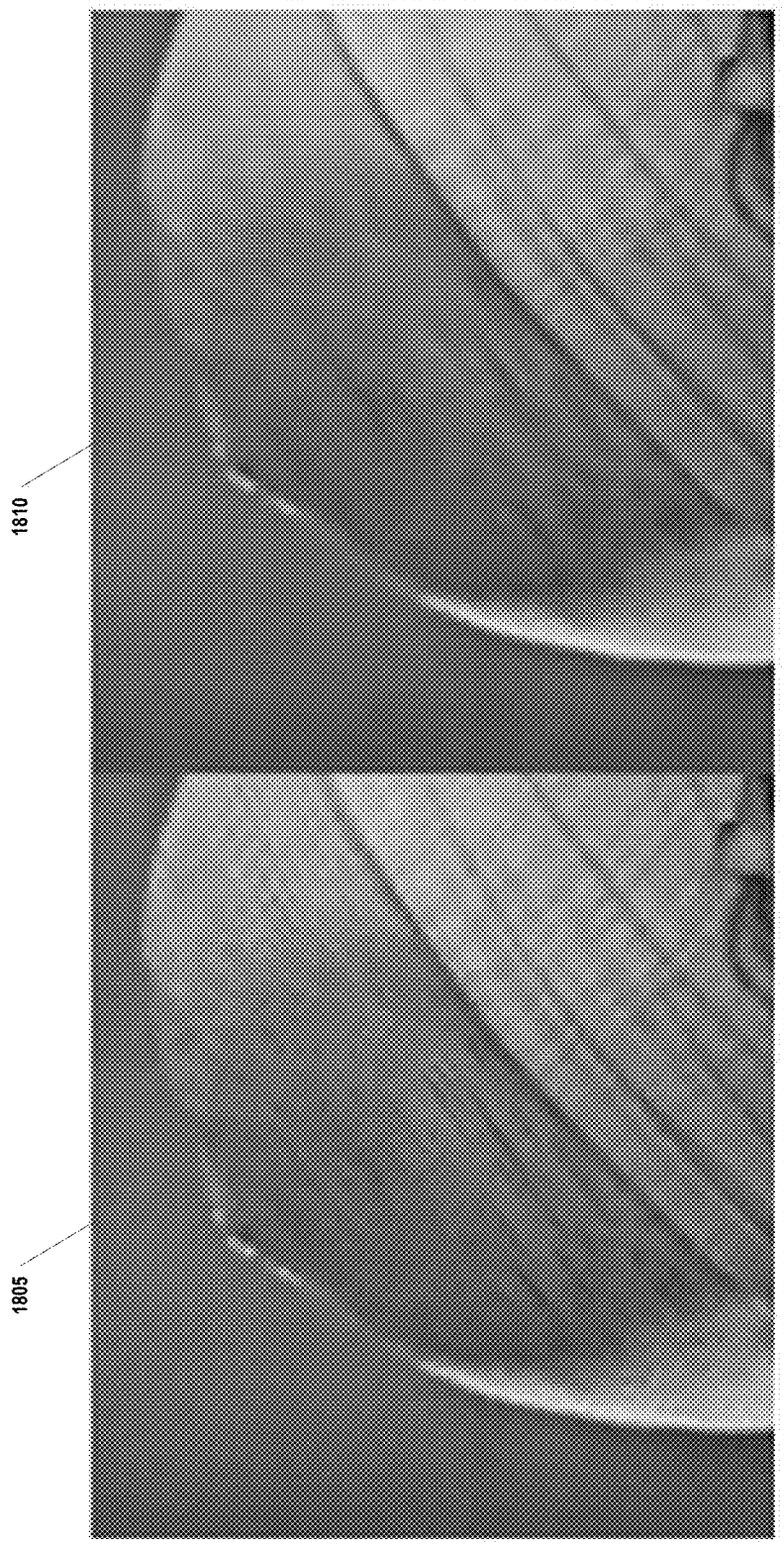
FIG. 18 provides an additional comparison of the image shown in FIG. 17, zoomed into the top corner of the image.

FIGS. 17 and 18 illustrate comparisons of the Image Enhancement Process, as implemented in some embodiments of the present invention, with the conventional super-resolution method of Adaptive Sparse Domain Selection (ASDS) using the Lena image. FIG. 17 provides a comparison of an image 1705 processed by the Image Enhancement Process described herein (resulting in a PSNR of 36.91) and an image 1710 processed by ASDS (resulting of a PSNR of 36.54). FIG. 18 provides an additional comparison of the image shown in FIG. 17, zoomed into the top corner of the image. This comparison shows that details (high frequencies) are recovered better with the Image Enhancement Process. Specifically image 1805 (processed by the Image Enhancement Process) resulted in a PSNR of 36.91, while image 1810 (processed with ASDS) results in a PSNR of 36.54. It can be seen that our method gives better results in terms of visual quality (note the preserved details on the "hat") and in terms of PSNR.

Figure 19:
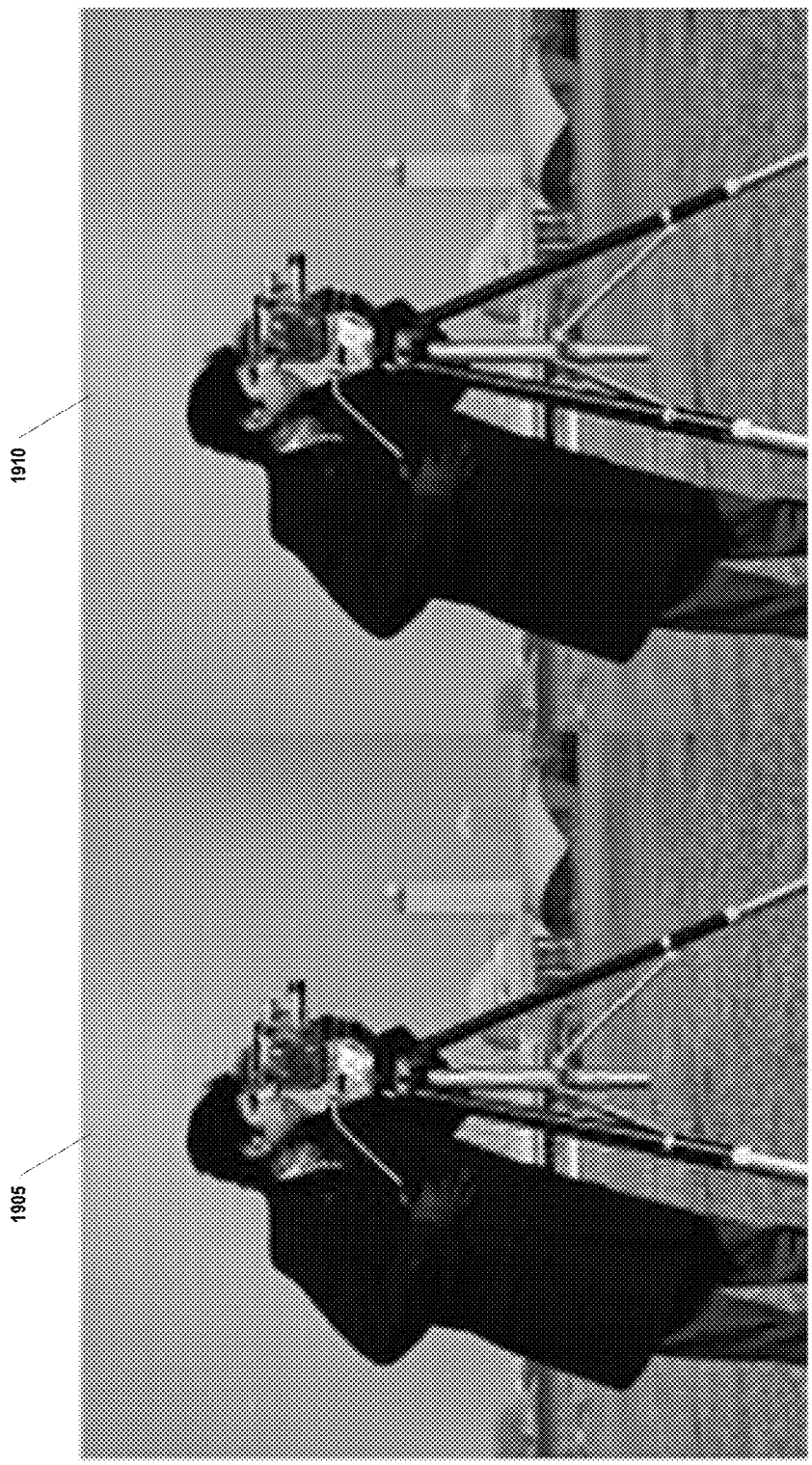
FIG. 19 illustrates an additional comparison of the Image Enhancement Process with ASDS, using the Cameraman image.

FIG. 19 illustrates another comparison of the Image Enhancement Process with ASDS, using the Cameraman image. Image 1905 shows the results for the Image Enhancement Process (PSNR=27.90), while image 1910 shows the results for ASDS (PSNR=28.00). Although having slightly lower PSNR, the Image Enhancement Process preserves the details better (note the grass). The Image Enhancement Process gives competitive results with those of ASDS. It should be noted that a benefit of Image Enhancement Process is that it may not require any set of training images whereas ASDS has to learn a dictionary from training data.

Figure 20:
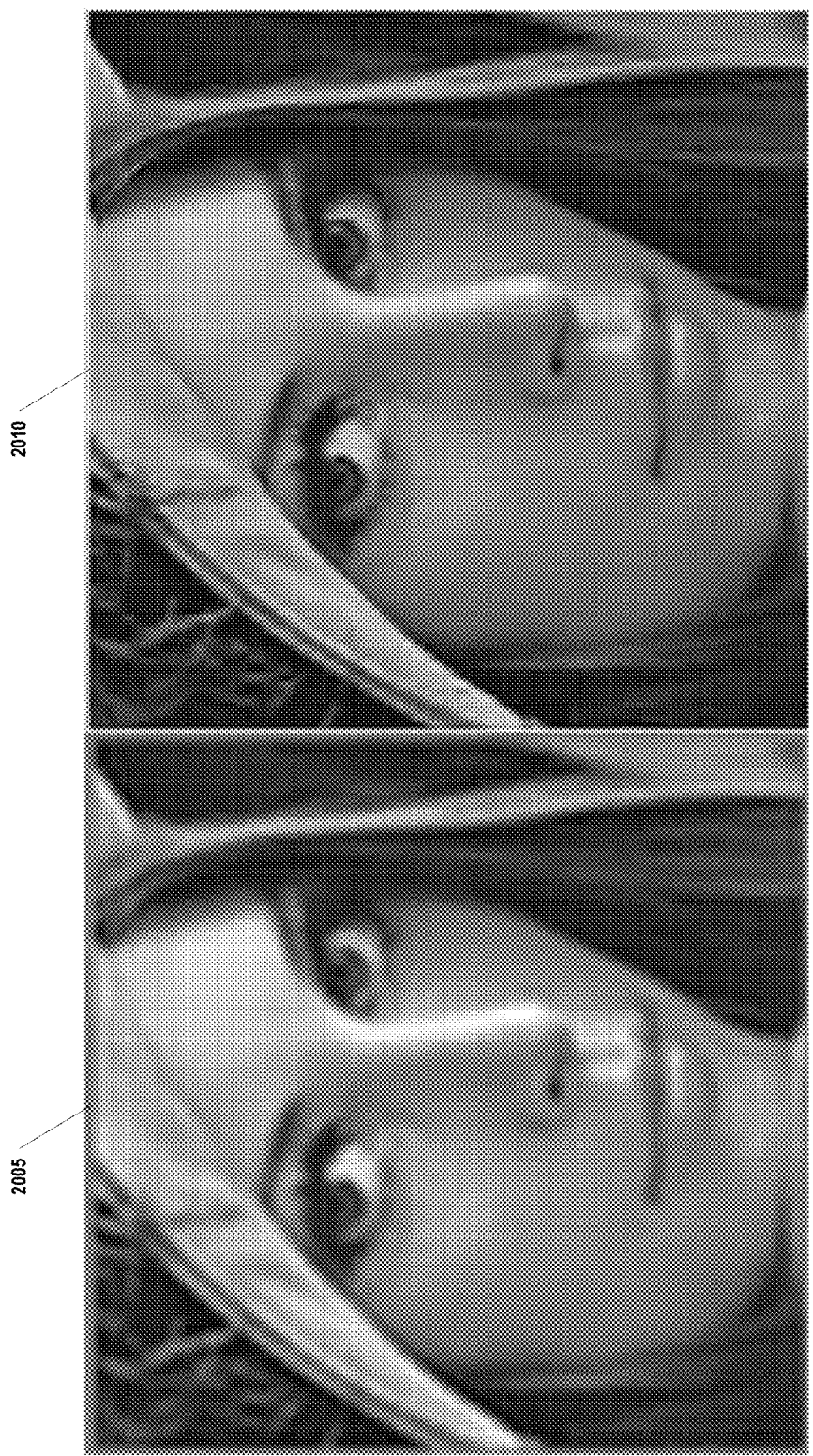
FIG. 20 illustrates a comparison of the Image Enhancement Process, as implemented in some embodiments of the present invention, with Variational Bayesian based SR (VBSR) using the Lena image.
Figure 21:
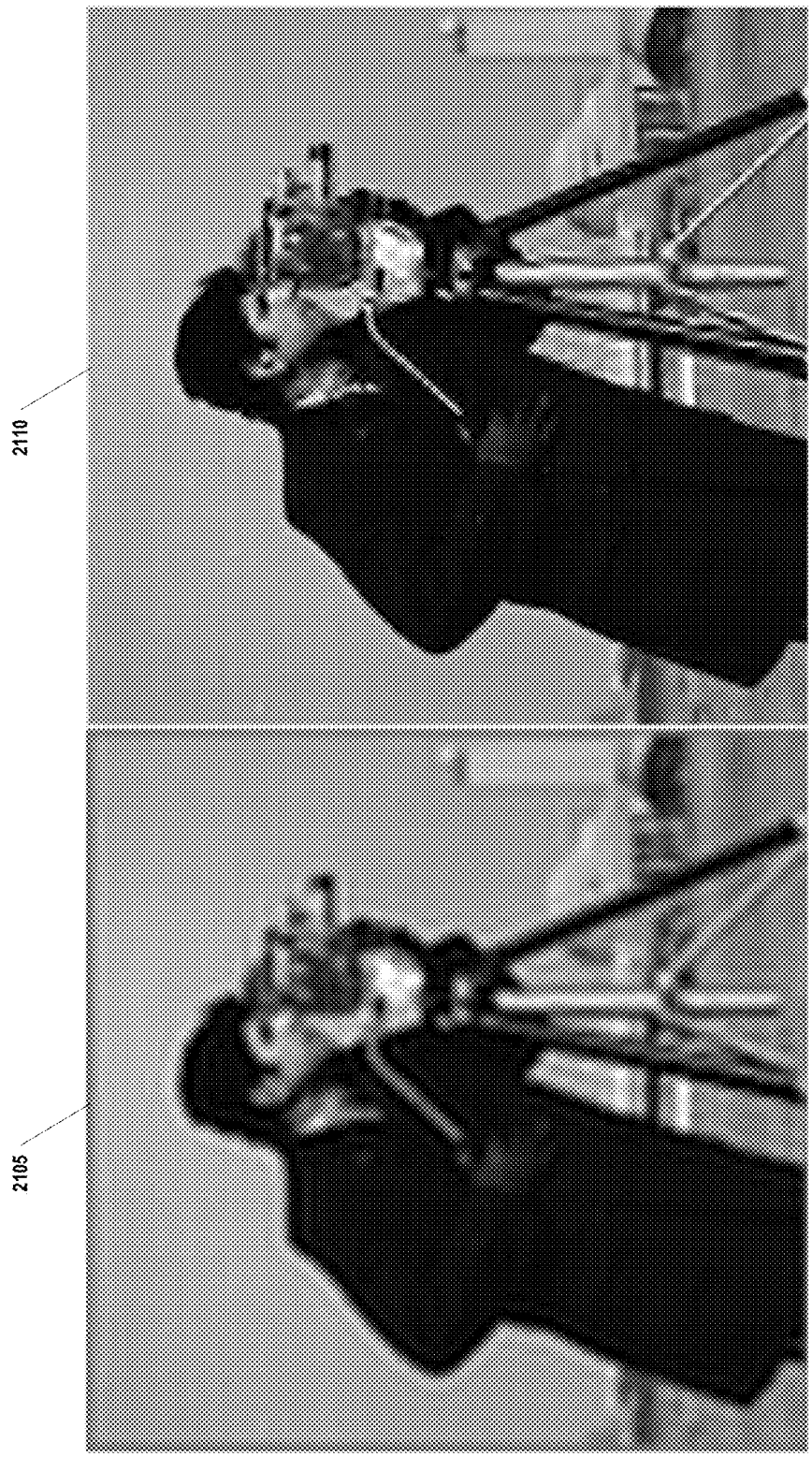
FIG. 21 illustrates a comparison of the Image Enhancement Process, as implemented in some embodiments of the present invention, with VBSR using the Cameraman image.

FIGS. 20 and 21 illustrate comparisons of the Image Enhancement Process, as implemented in some embodiments of the present invention, with Variational Bayesian based SR (VBSR). FIG. 20 provides the results for the Lena image. Image 2005 shows the results for VBSR, while image 2010 shows the results for the Image Enhancement Process. FIG. 21 provides the results for the Cameraman image. In FIG. 21, image 2105 shows the results for VBSR, while image 2110 shows the results for the Image Enhancement Process. Note that no ringing artifacts are present in image 2110.

Figure 22:
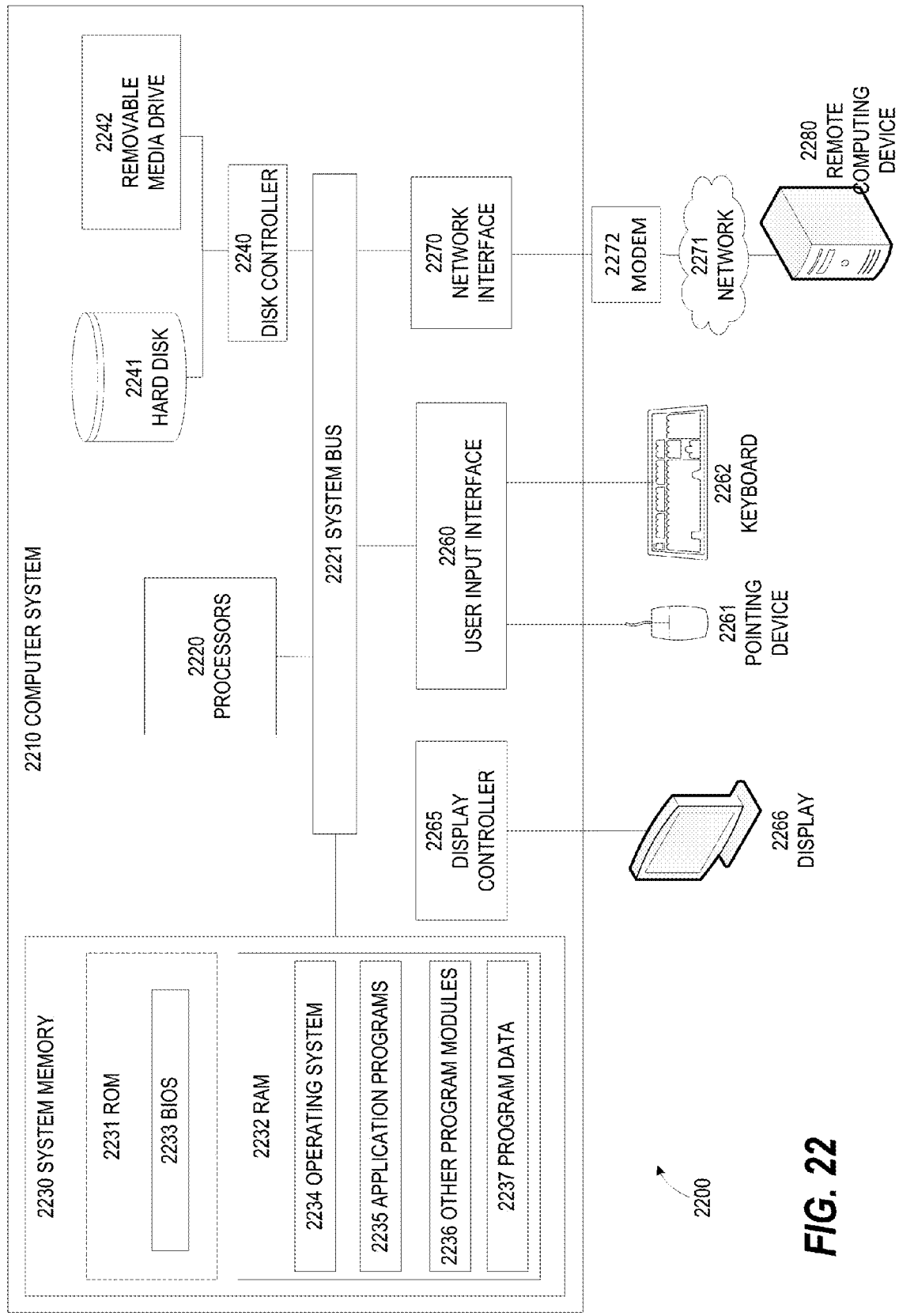
FIG. 22 illustrates an exemplary computing environment within which embodiments of the invention may be implemented

FIG. 22 illustrates an exemplary computing environment 2200 within which embodiments of the invention may be implemented. For example, computing environment 2200 may be used to implement one or more components of system 100 shown in FIG. 1. Computers and computing environments, such as computer system 2210 and computing environment 2200, are known to those of skill in the art and thus are described briefly here.

As shown in FIG. 22, the computer system 2210 may include a communication mechanism such as a system bus 2221 or other communication mechanism for communicating information within the computer system 2210. The computer system 2210 further includes one or more processors 2220 coupled with the system bus 2221 for processing the information.

The processors 2220 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 22, the computer system 2210 also includes a system memory 2230 coupled to the system bus 2221 for storing information and instructions to be executed by processors 2220. The system memory 2230 may include computer readable storage media in the form of volatile and/or nonvolatile memory, such as read only memory (ROM) 2231 and/or random access memory (RAM) 2232. The RAM 2232 may include other dynamic storage device(s) (e.g., dynamic RAM, static RAM, and synchronous DRAM). The ROM 2231 may include other static storage device(s) (e.g., programmable ROM, erasable PROM, and electrically erasable PROM). In addition, the system memory 2230 may be used for storing temporary variables or other intermediate information during the execution of instructions by the processors 2220. A basic input/output system 2233 (BIOS) containing the basic routines that help to transfer information between elements within computer system 2210, such as during start-up, may be stored in the ROM 2231. RAM 2232 may contain data and/or program modules that are immediately accessible to and/or presently being operated on by the processors 2220. System memory 2230 may additionally include, for example, operating system 2234, application programs 2235, other program modules 2236 and program data 2237.

The computer system 2210 also includes a disk controller 2240 coupled to the system bus 2221 to control one or more storage devices for storing information and instructions, such as a magnetic hard disk 2241 and a removable media drive 2242 (e.g., floppy disk drive, compact disc drive, tape drive, and/or solid state drive). Storage devices may be added to the computer system 2210 using an appropriate device interface (e.g., a small computer system interface (SCSI), integrated device electronics (IDE), Universal Serial Bus (USB), or FireWire).

The computer system 2210 may also include a display controller 2265 coupled to the system bus 2221 to control a display or monitor 2266, such as a cathode ray tube (CRT) or liquid crystal display (LCD), for displaying information to a computer user. The computer system includes an input interface 2260 and one or more input devices, such as a keyboard 2262 and a pointing device 2261, for interacting with a computer user and providing information to the processors 2220. The pointing device 2261, for example, may be a mouse, a light pen, a trackball, or a pointing stick for communicating direction information and command selections to the processors 2220 and for controlling cursor movement on the display 2266. The display 2266 may provide a touch screen interface which allows input to supplement or replace the communication of direction information and command selections by the pointing device 2261.

The computer system 2210 may perform a portion or all of the processing steps of embodiments of the invention in response to the processors 2220 executing one or more sequences of one or more instructions contained in a memory, such as the system memory 2230. Such instructions may be read into the system memory 2230 from another computer readable medium, such as a magnetic hard disk 2241 or a removable media drive 2242. The magnetic hard disk 2241 may contain one or more datastores and data files used by embodiments of the present invention. Datastore contents and data files may be encrypted to improve security. The processors 2220 may also be employed in a multi-processing arrangement to execute the one or more sequences of instructions contained in system memory 2230. In alternative embodiments, hard-wired circuitry may be used in place of or in combination with software instructions. Thus, embodiments are not limited to any specific combination of hardware circuitry and software.

As stated above, the computer system 2210 may include at least one computer readable medium or memory for holding instructions programmed according to embodiments of the invention and for containing data structures, tables, records, or other data described herein. The term "computer readable medium" as used herein refers to any medium that participates in providing instructions to the processors 2220 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 2241 or removable media drive 2242. Non-limiting examples of volatile media include dynamic memory, such as system memory 2230. Non-limiting examples of transmission media include coaxial cables, copper wire, and fiber optics, including the wires that make up the system bus 2221. Transmission media may also take the form of acoustic or light waves, such as those generated during radio wave and infrared data communications.

The computing environment 2200 may further include the computer system 2210 operating in a networked environment using logical connections to one or more remote computers, such as remote computing device 2280. Remote computing device 2280 may be a personal computer (laptop or desktop), a mobile device, a server, a router, a network PC, a peer device or other common network node, and typically includes many or all of the elements described above relative to computer system 2210. When used in a networking environment, computer system 2210 may include modem 2272 for establishing communications over a network 2271, such as the Internet. Modem 2272 may be connected to system bus 2221 via user network interface 2270, or via another appropriate mechanism.

Network 2271 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 2210 and other computers (e.g., remote computing device 2280). The network 2271 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 2271.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof No claim element herein is to be construed under the provisions of 35 U.S.C. 112, sixth paragraph, unless the element is expressly recited using the phrase "means for."

We claim:

1. A computer-implemented method of enhancing one or more images, the method comprising:
   receiving, by a computer, one or more observed images;
   identifying, by the computer, a plurality of wavelet bases;
   estimating, by the computer, a noise variance value;
   estimating, by the computer, a blurring kernel based on one or more system calibration parameters;
   determining a low-pass blurring filter operator based on the blurring kernel;
   determining a downsampling operator;
   selecting, by the computer, a tuning parameter based on the noise variance value;
   creating, by the computer, a cost function which generates one or more denoised super-resolution images based on the observed images and the plurality of wavelet bases, the cost function comprising:
      a sparsity inducing norm applied to the plurality of wavelet bases,
      the tuning parameter applied to the sparsity inducing norm, and
      a constraint requiring the one or more denoised super-resolution images to be equal to a result of applying the low-pass blurring filter operator and the downsampling operator to the one or more denoised super-resolution images; and
   generating, by the computer, the one or more denoised super-resolution images by minimizing the cost function.

2. The method of claim 1, wherein the plurality of wavelet bases comprise a plurality of Daubechies wavelet bases.

3. The method of claim 2, wherein the plurality of wavelet bases further comprise a plurality of cycle-spinned versions of the plurality of Daubechies wavelet bases.

4. The method of claim 2, wherein the plurality of wavelet bases further comprise a plurality of complex dual wavelet transform versions of the plurality of Daubechies wavelet bases.

5. The method of claim 1, wherein the cost function is minimized using an alternating direction method of multipliers (ADMM) algorithm.

6. A computer-implemented method of enhancing one or more images, the method comprising:
   receiving one or more observed images;
   identifying a plurality of wavelet bases;
   creating a cost function which generates one or more denoised images based on the observed images and the plurality of wavelet bases, wherein the cost function applies a sparsity-inducing norm to the plurality of wavelet bases; and
   generating the one or more denoised images by minimizing the cost function, wherein minimization of the cost function is constrained by applying a low-pass blurring filter operator and a downsampling operator to the one or more denoised images.

7. The method of claim 6, further comprising:
   estimating a noise variance value;
   selecting a tuning parameter based on the noise variance value,
   wherein the cost function applies the tuning parameter to the sparsity-inducing norm applied to the plurality of wavelet bases.

8. The method of claim 6, further comprising:
   estimating a blurring kernel based on one or more system calibration parameters;
   determining the low-pass blurring filter operator based on the blurring kernel; and
   determining the downsampling operator.

9. The method of claim 6, wherein the plurality of wavelet bases comprise a plurality of Daubechies wavelet bases.

10. The method of claim 9, wherein the plurality of wavelet bases further comprise a plurality of cycle-spinned versions of the plurality of Daubechies wavelet bases.

11. The method of claim 9, wherein the plurality of wavelet bases further comprise a plurality of complex dual wavelet transform versions of the plurality of Daubechies wavelet bases.

12. The method of claim 6, wherein the cost function is minimized using an alternating direction method of multipliers (ADMM) algorithm.

13. The method of claim 6, wherein identifying the plurality of wavelet bases comprises:
   receiving a user selection of the plurality of wavelet bases.

14. A method of enhancing observed images, the method comprising:
   receiving one or more observed images;
   estimating a blurring kernel based on one or more system calibration parameters;
   determining a low-pass blurring filter operator based on the blurring kernel;
   determining a downsampling operator;
   creating a cost function which generates one or more super-resolution images based on the one or more observed images by applying a sparsity-inducing norm to a plurality of wavelet bases; and
   generating the one or more super-resolution images by minimizing the cost function, wherein minimization of the cost function is constrained by requiring the one or more super-resolution images to be equal to a result of applying the low-pass blurring filter operator and the downsampling operator to the one or more super-resolution images.

15. The method of claim 14, wherein minimization of the cost function is performed using an iterative reweighted L−1 norm minimization.

16. The method of claim 14, wherein the plurality of wavelet bases comprise a plurality of Daubechies wavelet bases.

17. The method of claim 16, wherein the plurality of wavelet bases further comprise a plurality of cycle-spinned versions of the plurality of Daubechies wavelet bases.

18. The method of claim 16, wherein the plurality of wavelet bases further comprise a plurality of complex dual wavelet transform versions of the plurality of Daubechies wavelet bases.

19. The method of claim 14, wherein the cost function includes one or more denoising terms applied to the observed images.

20. The method of claim 19, further comprising:
   estimating a noise variance value; and
   selecting a tuning parameter based on the noise variance value,
   wherein the cost function applies the tuning parameter to the sparsity-inducing norm applied to the plurality of wavelet bases.

* * * * *